Figure 5:
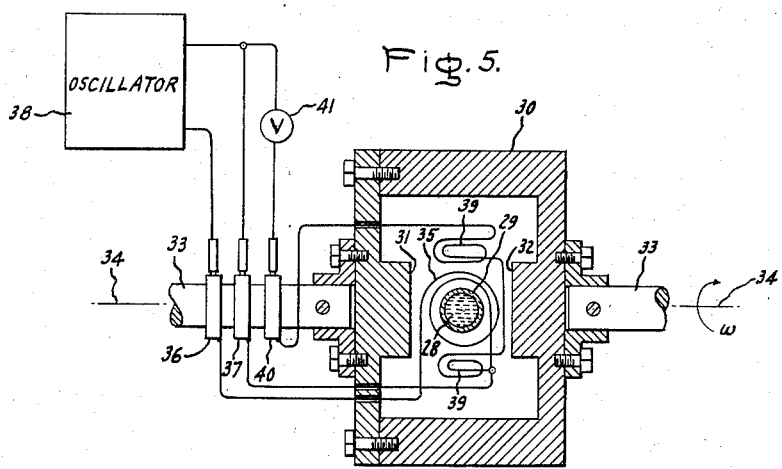

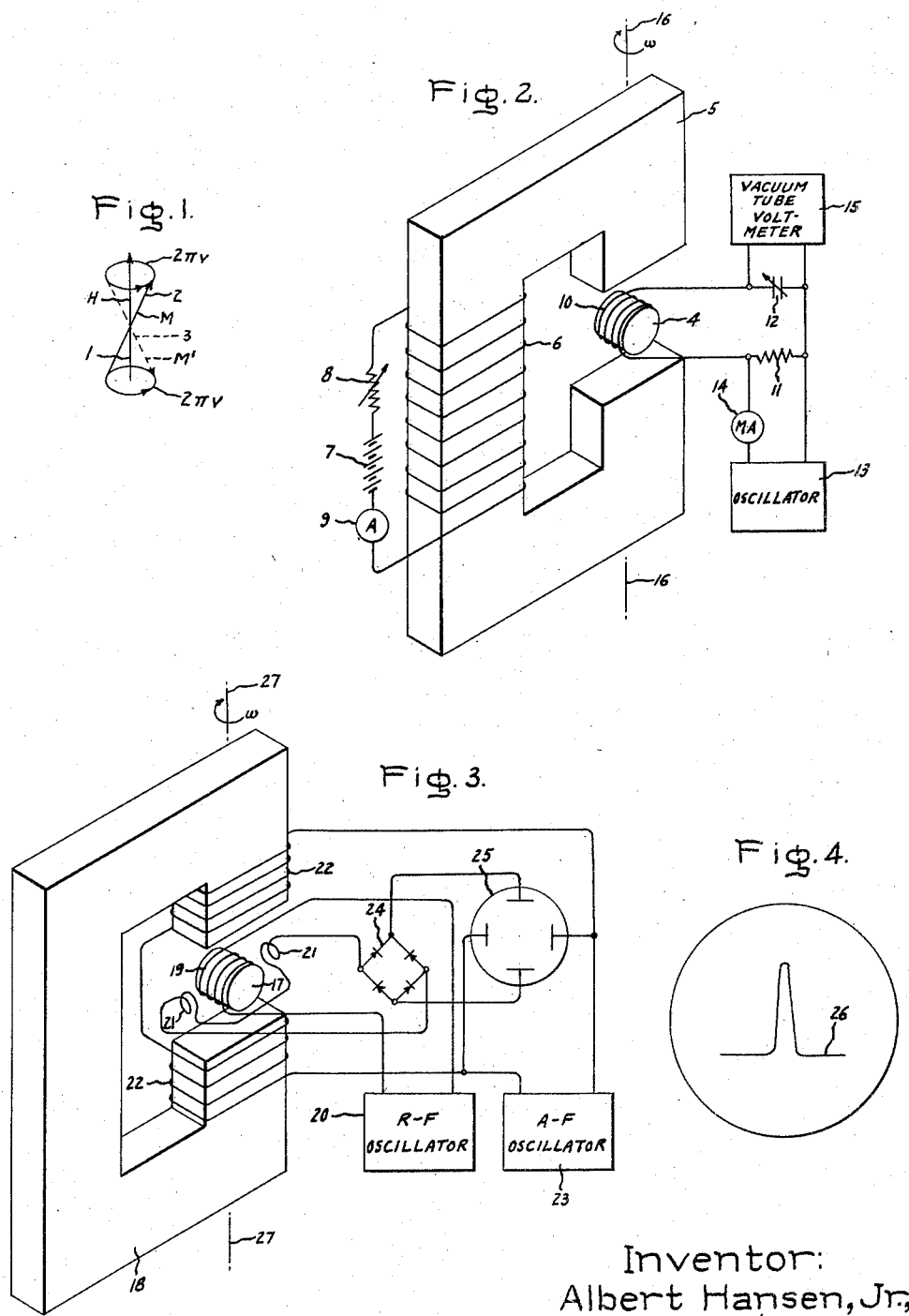

July 1, 1958  A. HANSEN, JR  2,841,760
METHOD AND APPARATUS FOR MEASURING ANGULAR MOTION
Filed Oct. 4, 1952  2 Sheets-Sheet 2

Inventor:
Albert Hansen, Jr,
by Richard E. Hosley
His Attorney.

United States Patent Office 2,841,760
Patented July 1, 1958

2,841,760

METHOD AND APPARATUS FOR MEASURING ANGULAR MOTION

Albert Hansen, Jr., Lynn, Mass., assignor to General Electric Company, a corporation of New York Application October 4, 1952, Serial No. 313,153

26 Claims. (Cl. 324—.5)

My invention relates to methods and apparatus for measuring angular motion, based upon magnetic resonance phenomena.

A brief description of magnetic resonance theory will aid the explanation of my invention. More complete treatments of the theory may be found in texts on atomic physics and in numerous articles which have appeared in scientific and technical publications. It will be understood that the theoretical matter present here is for illustrative purposes only, and is not intended to limit the scope of my invention.

It is known that the nuclei of many atoms have an angular momentum, or spin, and likewise have a magnetic moment. When such nuclei are placed in a magnetic field, their magnetic moments tend to precess about the field direction at a rate known as the Larmor frequency, the value of which is given by the relation $2\pi\nu = \gamma H$, where $\nu$ is the Larmor, or precession, frequency, $H$ is the magnetic field intensity, and $\gamma$ is a quantity known as the gyromagnetic ratio which is proportional to the quotient of the magnetic moment of the nucleus divided by its angular momentum. For any one given kind of atomic nucleus, the gyromagnetic ratio is a constant, so that the Larmor frequency is directly proportional to the magnetic field intensity. The nuclei of 26 or more kinds of atoms and isotopes are known to have magnetic moments which precess in this manner. For simplicity in the following discussion, the proton, or hydrogen nucleus, will be considered as a typical example, but my invention is not limited to the use of protons, since other nuclei may be used without materially altering the principles involved.

Chemical bonds appear to have no appreciable effect on the Larmor frequency. Consequently, the protons used in magnetic resonance apparatus may be hydrogen nuclei in any convenient chemical combination—for example, ordinary water. However, in practice small quantities of other substances, such as manganous sulphate or other paramagnetic salts, are often dissolved in the water for well-known reasons having to do with the "relaxation time," which need not be discussed to explain the present invention. A 1/250 molar solution of manganous sulphate in 1 cc. of distilled water has been employed with good results as a proton sample in magnetic resonance equipment.

The gyromagnetic ratio $\gamma$ of the proton is approximately $2.67 \times 10^4$ per oersted-second. Thus, the Larmor frequency of proton precession in a magnetic field of $H$ oersteds is $$\frac{2.67}{2\pi} \times 10^4 \times H \text{ cycles per second}$$

For example, if $H$ is 10,000 oersteds, the Larmor frequency is approximately 42.5 megacycles per second.

Assume that a large number of protons are placed in a homogeneous, unidirectional magnetic field, so that the magnetic moments precess about the field direction at the Larmor frequency. Considering the geometric projections of the proton magnetic moments on the field direction, it will be found that two orientations of the protons exist: some of the protons have their magnetic moments aligned with the field, which is called the parallel orientation, while others have their magnetic moments aligned against the field, which is called the anti-parallel orientation. The anti-parallel orientation represents a higher energy level than the parallel orientation, since work must be done to turn the magnetic moments against the field. However, at temperatures normally encountered, the energy difference between the two orientations is very small compared to the energy of thermal agitation.

Because of the thermal effects, frequent transitions of individual nuclei from one orientation to the other occur, but if the protons are in thermal equilibrium, it is known that the probability as a function of time for a transition from the higher energy level to the lower energy level is slightly greater than the probability for the reverse transition, so that, under such conditions, on the average a slightly larger number of protons will be found in the lower-energy parallel orientation than in the higher-energy anti-parallel orientation. For example, of 2,000,000 protons in thermal equilibrium at room temperature, 1,000,007 may have the parallel orientation, while the remainder have the anti-parallel orientation.

Now assume that a second magnetic field is introduced at right angles to the first field, and that the second field alternates at the Larmor frequency of the protons precessing in the first field. Now those protons having the low-energy parallel orientation can absorb energy from the alternating field, which increases the probability of transitions from the parallel orientation to the higher-energy anti-parallel orientation and thus tends to equalize the numbers of protons in the two energy levels. If the alternating field is sufficiently strong, the proton populations in the two energy levels soon will become substantially equal, and no more energy will be absorbed. But if the alternating field is a bit weaker, the absorption of energy by the protons from the alternating field may be balanced by their tendency to return to thermal equilibrium, so that there can be substantially continuous absorption of energy from the alternating field. Therefore, there is an optimum strength of the alternating field, which can be determined by experimental adjustment, at which maximum energy is absorbed by the protons. Although quantum considerations prohibit more than two orientations of protons in a magnetic field, other nuclei may have as many as 10 possible orientations. This does not affect the basic principles involved, since transitions may still take place between adjacent energy levels represented by different orientations.

This absorption of energy by precessing nuclei, which generally occurs only when the frequency of the alternating field is substantially the same as the Larmor frequency of the nuclei, is called nuclear magnetic resonance. Similar phenomena, known as electronic magnetic resonance, can occur in substances having uncoupled electrons. In general, there are two classes of such substances, one class being strongly paramagnetic salts, and the other class being ferromagnetic metals and alloys.

For electronic magnetic resonance in paramagnetic salts, sometimes called paramagnetic resonance, the same relations apply as in proton resonance, except that the gyromagnetic ratio of the electron is used in place of the gyromagnetic ratio of the proton. Since the electron has a gyromagnetic ratio which is about 700 times as large as that of the proton, the Larmor frequency for paramagnetic resonance is about 700 times as great as that for proton resonance in the same magnetic field.

In ferromagnetic metals and alloys, the magnetic induction B inside the metal is not substantially equal to the magnetic field intensity H. In this electronic resonance case, sometimes called ferromagnetic resonance, the Larmor frequency $v$ is given by the relation $$2\pi v = \gamma \sqrt{BH}$$

where $\gamma$ is the gyromagnetic ratio of the electron, H is the magnetic field intensity, and B represents the magnetic induction which is equal to the product of the magnetic field intensity and the permeability of the metal. The present invention may utilize either nuclear magnetic resonance or electronic magnetic resonance. The generic term "magnetic resonance" includes both. Since the basic principles are the same, only nuclear resonance need be discussed in detail.

The magnetic resonance phenomenon can be detected by various means, several of which are well known. For example, assume that the alternating field is supplied by a suitably energized coil placed around the proton sample, which is a common arrangement in nuclear resonance apparatus. Energy absorption from the field by the protons at resonance causes a measurable decrease in the apparent "Q" of the coil, where Q is the well-known symbol for the ratio of energy stored per cycle to energy dissipated per cycle. This is known as the absorption effect. There is also a small, but measurable, change in the apparent inductance of the coil. This is known as the dispersion effect. Furthermore, when a second coil is placed near the proton sample with its axis orthogonal to the respective directions of the two applied magnetic fields, at resonance the precessing proton magnetic moments induce an alternating voltage in the second coil. This is known as the induction effect. While any of these three effects may be used to detect the existence of magnetic resonance conditions, in practice the absorption and induction effects are most frequently used.

The chief object of the present invention is to provide a novel method and apparatus for measuring angular motion based upon magnetic resonance phenomena. Since no moving parts other than atomic nuclei or electrons are required, greater precision appears possible with my new method than can be obtained with techniques previously employed. Other objects and advantages of the invention will appear as the description proceeds.

Briefly stated, in one of its aspects my invention is based upon the concept that the Larmor frequency must be referred to irrotational space coordinates, while the frequency of the applied alternating field is referred to coordinates which rotate in space with the apparatus. This may be visualized in either of two ways: First, consider magnetic resonance apparatus having protons which precess in a unidirectional magnetic field at an angular velocity $2\pi v$, referred to irrotational coordinates, in a plane perpendicular to the field direction about which the protons precess. Now, assume that the apparatus rotates in the same plane with an angular velocity $\omega$. To an observer rotating with the apparatus, the angular velocity of precession appears to be $2\pi v - \omega$, and the frequency of the alternating magnetic field applied by the apparatus to produce magnetic resonance must be $$f = v - \frac{\omega}{2\pi}$$

Since $v$ can be calculated from known or measured values of $\gamma$ and H, $\omega$ can be determined as a function of $f$. Now, consider that the observer is stationary, while the apparatus rotates. The angular velocity of precession is $2\pi v$. It is known that an alternating field is equivalent to two field components rotating in opposite directions, and that only the field component which rotates in the same direction as the proton precession need be considered. This field component rotates with an angular velocity $2\pi f$ referred to coordinates which rotate with the apparatus. To the stationary observer, the rotating field component has a velocity $2\pi f + \omega$, and since this must equal $2\pi v$ for magnetic resonance, we again find that $$f = v - \frac{\omega}{2\pi}$$

This conclusion has been verified by experiment.

It will be appreciated that my new method has many practical applications. For example, a portion of the apparatus may be mounted on a rotating shaft to measure the angular velocity of the shaft. Or, the apparatus may be installed on a ship, airplane, or other craft to measure angular deviations from a predetermined heading. Many other applications will be apparent to those skilled in the art. Consequently, it is intended that the applications described be taken as illustrative only, and not in a limiting sense.

Figure 6:
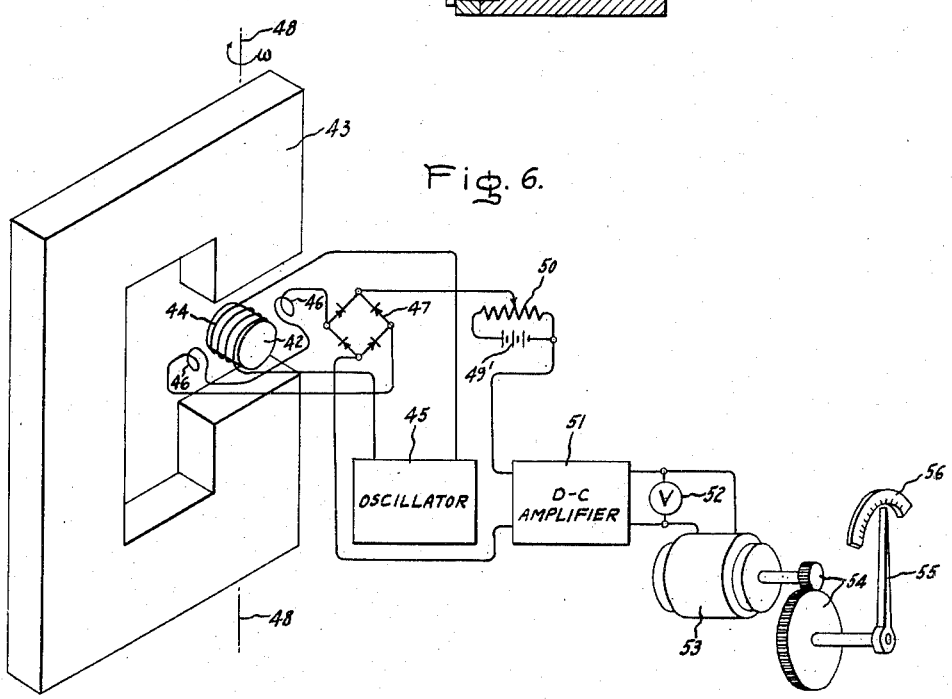
Figure 7:
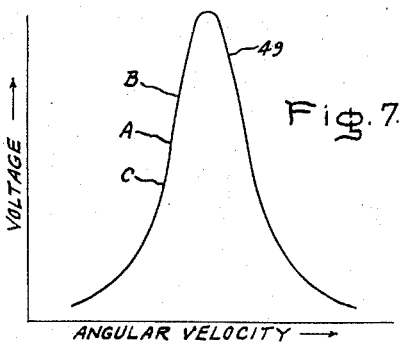

My invention will be better understood from the following description taken in connection with the accompanying drawings, and its scope will be pointed out in the appended claims. In the drawings, Fig. 1 is a vector representation of precessing magnetic moments, Fig. 2 is a schematic representation of magnetic resonance apparatus, Fig. 3 is a schematic representation of other magnetic resonance apparatus, Fig. 4 is a representation of an oscilloscope trace, Fig. 5 is a schematic representation of other magnetic resonance apparatus applied to a rotating shaft for measuring its angular velocity, Fig. 6 is a schematic representation of other magnetic resonance apparatus adapted to measure angular deviations from a desired heading, and Fig. 7 is a diagram of voltage versus angular velocity used in explaining operation of the Fig. 6 apparatus.

Referring now to Fig. 1, the vector 1 represents the direction of a magnetic field having an intensity H. The vector 2 represents the magnetic moment M of a proton which precesses in this magnetic field at the Larmor frequency $v$. The tip of vector 2 moves around vector 1 at an angular velocity $2\pi v$. It may be noted that the geometric projection of vector 2 on the direction of the field points in the same direction as vector 1; therefore vector 2 represents the magnetic moment of a proton having the parallel orientation with respect to the field. The vector 3 represents the magnetic moment M' of another proton which also precesses in the field at the Larmor frequency. It will be noted that the geometric projection of vector 3 on the field direction points in the opposite direction to vector 1; therefore vector 3 represents the magnetic moment of a proton having the antiparallel orientation with respect to the field.

It is apparent that the vector 3 represents a higher energy level than the vector 2, since work must be done to turn the magnetic moment vector against the field. This energy may be supplied by the thermal agitation which is always present, so that frequent transitions of individual protons from one orientation to the other occur. Each time that a transition from the parallel orientation to the anti-parallel orientation occurs, energy is absorbed; and each time that a transition from the anti-parallel orientation to the parallel orientation occurs, an equal amount of energy is released. Under thermal equilibrium conditions, these two transitions occur equally often, so that the energy absorbed exactly equals the energy released. However, probability considerations show that, on the average, each proton remains in the parallel orientation for a slightly longer time between transitions than in the anti-parallel orientation, so that a slightly larger number of protons have the lower-energy parallel orientation than have the higher-energy antiparallel orientation.

Now assume that an alternating magnetic field is applied at right angles to the vector 1. Those protons having the parallel orientation represented by vector 2 can absorb energy from this field, provided the frequency of the alternating field is the same as the Larmor frequency $\nu$. As has already been explained, this energy absorption tends to equalize the proton populations of the two energy levels, and leads to the phenomena of magnetic resonance.

When considering a large number of precessing protons, it will be found that all of the protons do not have precisely the same precession frequency. This is chiefly due to inhomogeneities in the magnetic field, which may be caused in part by slight inhomogeneities in the applied field, and caused in part by the magnetic influence of adjacent protons. Thus, considering $\nu$ as the average precession frequency, it will be found that energy may be absorbed from an applied alternating field over a narrow band of frequencies centered about the frequency $\nu$. If energy absorption is plotted as a function of applied field frequency, the result is a curve similar in shape to a very sharp resonance curve, equivalent to that of a resonant electrical circuit having a Q which may be in the order of 70,000, for example.

Refer now to Fig. 2, which represents one type of magnetic resonance apparatus in which resonance conditions are determined by the absorption effect. A proton sample 4 may comprise about 1 cc. of water in a suitable container, such as a small glass tube sealed at both ends. A unidirectional magnetic field of intensity H is applied to the sample by a magnet 5, which may be either a permanent magnet or an electromagnet. An electromagnet is illustrated, comprising a winding 6 energized by a battery 7 in series with a rheostat 8 and an ammeter 9. The field intensity H can be adjusted by rheostat 8, and its value can be determined from the reading of ammeter 9 and known characteristics of the magnetic circuit.

A coil 10 is wound about sample 4 as shown. The axis of coil 10 is at right angles to the direction of the magnetic field applied to the sample by magnet 5. When suitably energized as hereinafter explained, coil 10 provides an alternating magnetic field at right angles to the unidirectional field applied to the sample, and when the energization of coil 10 is at the proper frequency, magnetic resonance occurs in the sample 4.

Coil 10 is connected in series with a resistor 11 and a capacitor 12, as shown. An oscillator 13 in series with a milliammeter 14 is connected across resistor 11, and a vacuum tube voltmeter 15 is connected to measure the voltage across capacitor 12.

The electrical circuit connected to coil 10 comprises a well-known Q-meter for measuring the apparent Q of coil 10. The value of resistor 11 is small compared to the series impedance of coil 10 and capacitor 12, so that oscillator 13 provides across resistor 11 an alternating voltage, the value of which can be determined from the known value of the resistor and the reading of milliammeter 14. In practice, this voltage is usually a constant. Alternating current from the oscillator also flows through coil 10 and capacitor 12, thereby energizing the coil. Capacitor 12 is adjusted for series resonance with coil 10. From elementary electrical circuit theory, it is known that the ratio of the voltage across capacitor 12 to the voltage across resistor 11 is numerically equal to the apparent Q of coil 10. This voltage, and hence the apparent Q of the coil, is measured by vacuum tube voltmeter 15.

Now, assume that the apparatus is stationary, and that rheostat 8 is adjusted so that the value of the magnetic field intensity H satisfies the relation $2\pi f = \gamma H$, or $$H = \frac{1}{\gamma}(2\pi f)$$

where H represents the magnetic field intensity, $\gamma$ is the gyromagnetic ratio of the proton, and $f$ is the oscillator frequency. The protons of sample 4 precess at the Larmor frequency given by the relation $2\pi\nu = \gamma H$, from which it follows that $\nu = f$. This is the condition for magnetic resonance, and the protons absorb energy from the alternating field supplied by coil 10. This energy absorption lowers the apparent Q of coil 10, and thus causes the indication of voltmeter 15 to decrease. If either the field intensity H or the oscillator frequency $f$ is changed slightly, the absorption of energy by the protons decreases, and the indication of voltmeter 15 increases. Thus, adjustment to magnetic resonance conditions can be made by adjusting either rheostat 8 or the oscillator frequency to the value at which the reading of voltmeter 15 is a minimum.

Now assume that the apparatus is rotated at an angular velocity $\omega$ about the axis represented by broken line 16, which is parallel to the direction of the unidirectional magnetic field applied to sample 4 by magnet 5. Now the condition for magnetic resonance is $$H = \frac{1}{\gamma}(\omega + 2\pi f)$$

Thus, if the apparatus is adjusted to magnetic resonance when $\omega$ equals zero, then when the apparatus is rotated the resonance conditions are not precisely met, and the indication of voltmeter 15 will rise by an amount related to the angular velocity $\omega$. Voltmeter 15 can be calibrated to indicate the angular velocity of the apparatus. Alternatively, either the field intensity H or the oscillator frequency $f$ can be readjusted for a minimum reading of voltmeter 15 while the apparatus rotates. The angular velocity $\omega$ can then be computed by the change in H or $f$ necessary to reestablish resonance conditions.

Fig. 3 illustrates another form of nuclear resonance apparatus, in which resonance conditions are determined by the induction effect. Proton sample 17 is in any convenient form. A unidirectional magnetic field of intensity H is applied to the sample by a magnet 18, which may be either a permanent magnet or an electromagnet. A permanent magnet is illustrated. An alternating magnetic field, at right angles to the unidirectional field, is supplied by a coil 19 suitably energized by a radio-frequency oscillator 20. There is also provided, adjacent to sample 17, a second coil 21 having its axis orthogonal to the respective directions of the two magnetic fields. In the absence of magnetic resonance, there is very little pickup in coil 21 from the magnetic fields. However, when magnetic resonance occurs in the sample 17, the precessing magnetic moments of the protons induce an alternating voltage in coil 21.

The magnetic intensity H is varied periodically by windings 22, which may be wound about the pole pieces of magnet 18 as shown, energized by an audio-frequency oscillator 23. Magnetic resonance occurs, and a voltage is induced in coil 21, each time that the magnetic intensity H of the unidirectional field reaches a value which satisfies the reasonance conditions.

The voltage induced in coil 21 is rectified by a bridge-type rectifier 24, and the rectified voltage is applied to the vertical deflecting plates of a cathode ray oscilloscope 25. Audio-frequency voltage from oscillator 23 is applied to the horizontal deflecting plates of the oscilloscope 25. Thus, there is a trace on the oscilloscope screen which represents the resonance conditions as a function of the variations in field intensity H. This trace is represented by curve 26, Fig. 4.

Assume that the apparatus is stationary, and that the frequency of oscillator 20 is adjusted so that magnetic resonance in sample 17 occurs when the current through windings 22 is zero. This occurs when the relation $$H=\frac{1}{\gamma}(2\pi f)$$

is satisfied. Now, the audio-frequency current through windings 22 periodically varies the value of H about this resonant value. Twice during each cycle of the audio frequency current, H has the resonant value, and a voltage is induced in coil 21 which deflects the oscilloscope trace 26 vertically, as shown in Fig. 4. Under the conditions assumed, this produces a peak in the trace 26 which appears at or near the center of the oscilloscope screen.

Now assume that the apparatus is rotated at an angular velocity ω about an axis 27 which is parallel to the direction of the field applied to the sample by magnet 18. Under these conditions, the resonant relation is $$H=\frac{1}{\gamma}(2\pi f+\omega)$$

Resonance now occurs at a different point in the audio-frequency current cycle, and the peak of curve 26 is shifted on the oscilloscope screen either to the left or to the right, depending upon the direction in which the apparatus is rotated. The oscilloscope screen may be calibrated in terms of the angular velocity ω, and the angular velocity at any time can be determined by noting the position of the resonant peak on the oscilloscope screen.

Fig. 5, which is partly in section, illustrates the application of magnetic resonance apparatus to the measurement of the angular velocity of a rotating shaft. A proton sample may comprise a small quantity of water 28 sealed in a glass tube 29. A unidirectional magnetic field of intensity H is applied to the sample by a permanent magnet 30 having poles 31 and 32. Magnet 30 may have the form of a drum-like structure, as shown, with its poles located inside the drum along its axis. The proton sample is centered within the drum and thus is shielded from external magnetic fields. The magnet 30 is attached to, and axially aligned with, the rotating shaft 33 whose angular velocity is to be measured. Both the shaft 33 and the drum 30 rotate at the angular velocity ω about the axis 34, which is parallel to the direction of the magnetic field applied to the proton sample by magnet 30.

A coil 35 surrounds the proton sample and has its axis at right angles to the direction of the field produced by magnet 30. Coil 35 is energized through slip rings 36 and 37 by an oscillator 38. Thus, coil 35 provides an alternating magnetic field at right angles to the unidirectional field which, when the frequency of the oscillator is adjusted to the proper value, produces magnetic resonance in the proton sample.

A second coil 39 has its axis orthogonal to the respective directions of the two magnetic fields, so that a voltage is induced in coil 39 whenever magnetic resonance occurs in the proton sample. Coil 39 is connected through slip rings 37 and 40 to a voltmeter 41. Voltmeter 41 indicates the resonance condition of the sample.

Now assume that shaft 33 is stationary, and that the frequency of oscillator 38 is adjusted to the proper value for magnetic resonance in the proton sample, which is indicated by a maximum reading of voltmeter 41. This frequency is given by the relation $$f=v=\frac{1}{2\pi}(\gamma H)$$

Now assume that the shaft is rotated at an angular velocity ω. This changes the resonant relation, as has already been explained, and the reading of voltmeter 41 decreases as a function of shaft velocity. Thus, voltmeter 41 may be calibrated in terms of shaft velocity. Alternatively, oscillator 38 can be readjusted for maximum indication of voltmeter 41 with the shaft rotating. The angular velocity is then given by the relation ω=γH−2πf.

Theoretically, only the two alternating current coils 35 and 39 need be rotated, and rotation of the sample and the permanent magnet is immaterial. In practice, it will usually be more convenient to rotate the sample and the permanent magnet also, as in the apparatus illustrated.

Fig. 6 illustrates the application of magnetic resonance apparatus to detect angular deviations from a predetermined heading. To a proton sample 42 there is applied a unidirectional magnetic field of intensity H by a magnet 43. An alternating magnetic field, at right angles to the unidirectional field, is provided by a coil 44 energized by an oscillator 45. A second coil 46 has its axis orthogonal to the respective directions of the two magnetic fields, so that a voltage is induced in coil 46 whenever magnetic resonance conditions exist in the proton sample 42. This induced voltage is rectified by a bridge-type rectifier 47.

Assume that the frequency of oscillator 45 is adjusted to substantially the magnetic resonance value when the apparatus is stationary. Now, assume that the apparatus is rotated at an angular velocity ω about an axis 48 which is parallel to the direction of the magnetic field supplied by magnet 43. The rotation of the apparatus affects the resonance conditions, as hereinbefore explained, so that the rectified voltage obtained from rectifier 47, as a function of angular velocity, may be represented by a curve such as curve 49, Fig. 7. Assume that the frequency of oscillator 45 is such that point A of curve 49 represents zero angular velocity. Now assume that a small angular velocity is applied to the apparatus in the same direction as the proton precession about the magnetic field, which may be considered the positive direction. This will produce a somewhat larger rectified voltage, as represented by point B of curve 49. Similarly, rotation in the opposite direction produces a decrease in the rectified voltage, as represented, for example, by the point C of curve 49. Over a small region, the slope of the magnetic resonance curve may be considered substantially uniform, so that the change in rectifier voltage is substantially proportional to the angular velocity of the apparatus.

Now, assume that the voltage represented by point A, at zero angular velocity, is balanced by an equal and opposite bias voltage, which may be applied by a battery 49′ and a resistor 50, as shown. The resulting voltage is applied to the input of a D.-C. amplifier 51. It will be apparent that the input voltage of amplifier 51 is zero when the angular velocity of the apparatus is zero, is positive and proportional to the angular velocity when the apparatus is rotated in the positive direction, and is negative and proportional to the angular velocity when the apparatus is rotated in the negative direction. This voltage is amplified by amplifier 51, and may be measured by a voltmeter 52 which gives indications proportional to the angular velocity, or rate of turn. The amplified voltage may also be applied to a small electric motor 53, which rotates at a speed proportional to the applied voltage and in a direction determined by its polarity. The shaft of motor 53 is connected through suitable speed-reducing gears 54 to a pointer 55, which cooperates with a scale 56. Thus, the position of pointer 55 indicates the integral of angular velocity as a function of time, or angular deviation.

Now, assume that the apparatus shown in Fig. 6 is placed on a ship, airplane, or other craft, so that the axis of coil 44 is in fixed relation to the heading of the craft, and that pointer 55 is adjusted to its mid-position, which may be zero on the scale 56, when the direction of the craft coincides with a predetermined heading. Any deviation of the craft from this predetermined heading rotates the apparatus, which shifts the magnetic resonance point and so produces a change in position of pointer 55 which corresponds to the angular deviation of the craft from the desired heading.

In any of the types of apparatus described, the magnetic resonance sample may contain, instead of protons, any of the numerous nuclei which have gyromagnetic ratios other than zero. The principles are the same, and it is only necessary to substitute in the resonance equations the gyromagnetic ratio for the particular nuclei employed in place of the gyromagnetic ratio of the proton. Likewise, a paramagnetic salt may be used as the magnetic resonant sample. In this case, the gyromagnetic ratio of the electron is used in the resonance relation. Or, a ferromagnetic metal or alloy may be employed. In this case, the angular velocity is given by the relation $$\omega = \gamma\sqrt{BH} - 2\pi f$$

A mathematical relation useful for any of the magnetic resonance forms is $\omega = 2\pi(\nu - f_r)$, in which $\omega$ is the angular velocity to be measured, $\nu$ is the Larmor frequency, which may be calculated, and $f_r$ is the oscillator frequency which produces magnetic resonance conditions.

It will be understood that my invention is not limited to the specific embodiments herein illustrated and described, and that the following claims are intended to cover all changes and modifications which do not depart from the true spirit and scope of the invention.

What I claim as new and desire to secure by Letters Patent of the United States is:

1. The method of measuring angular motion which comprises applying to a magnetic resonance sample a unidirectional magnetic field, providing means for applying an alternating magnetic field of frequency $f$ to said sample at right angles to said unidirectional field to produce substantial magnetic resonance at the Larmor frequency $\nu$ and rotating said alternating magnetic field applying means about an axis parallel to said unidirectional field at an angular velocity which is a function of the angular motion to be measured, deriving an electrical effect corresponding to the shift from the condition of magnetic resonance caused by the rotation of said alternating magnetic field applying means, and measuring said electrical effect.

2. The method of measuring angular motion which comprises applying to a magnetic resonance sample a unidirectional magnetic field, providing means for applying an alternating magnetic field to said sample at right angles to said unidirectional field, adjusting the fields to produce substantial magnetic resonance, rotating said alternating magnetic field applying means about an axis parallel to said unidirectional field at an angular velocity which is a function of the angular motion to be measured, readjusting one of said fields to produce substantial magnetic resonance, and measuring the change in the field necessary to reestablish magnetic resonance said change being a function of the angular velocity of said alternating magnetic field applying means.

3. The method of measuring angular motion which comprises applying to a nuclear resonant sample a unidirectional magnetic field, providing means for applying an alternating magnetic field to said sample at right angles to said unidirectional magnetic field, adjusting the fields to produce substantial nuclear resonance at the Larmor frequency, rotating said alternating magnetic field applying means about an axis parallel to said unidirectional field at an angular velocity which is a function of the angular motion to be measured, deriving an electrical effect corresponding to the shift from the condition of nuclear resonance caused by the rotation of said alternating magnetic field applying means, and measuring said electrical effect.

4. The method of measuring angular motion which comprises applying to a sample containing protons a unidirectional magnetic field, providing means for applying an alternating magnetic field to said sample at right angles to said unidirectional field, adjusting the fields to produce substantial proton magnetic resonance at the Larmor frequency, rotating said alternating magnetic field applying means about an axis parallel to said unidirectional field at an angular velocity which is a function of the angular motion to be measured, deriving an electrical effect corresponding to the shift from the condition of proton magnetic resonance caused by the rotation of said alternating magnetic field applying means, and measuring said electrical effect.

5. The method of measuring angular motion which comprises applying to a sample of water a unidirectional magnetic field, providing means for applying an alternating magnetic field to said sample at right angles to said unidirectional magnetic field, adjusting the fields to produce substantial proton magnetic resonance in the water at the Larmor frequency determined by the proton gyromagnetic ratio and the intensity of the unidirectional magnetic field, rotating said alternating magnetic field applying means about an axis parallel to said unidirectional field at an angular velocity which is a function of the angular motion to be measured, deriving an electrical effect corresponding to the shift from the condition of proton magnetic resonance caused by the rotation of said alternating magnetic field applying means, and measuring said electrical effect.

6. The method of measuring angular motion which comprises applying to a solution of manganous sulphate in water a unidirectional magnetic field, providing means for applying an alternating magnetic field to said sample at right angles to said unidirectional magnetic field, adjusting the fields to produce substantial proton magnetic resonance in the water at the Larmor frequency determined by the proton gyromagnetic ratio and the intensity of the unidirectional magnetic field, rotating said alternating magnetic field applying means about an axis parallel to said unidirectional field at an angular velocity which is a function of the angular motion to be measured, deriving an electrical effect corresponding to the shift from the condition of proton magnetic resonance caused by the rotation of said alternating magnetic field applying means, and measuring said electrical effect.

7. The method of measuring angular motion which comprises applying to a paramagnetic salt a unidirectional magnetic field, providing means for applying an alternating magnetic field to said sample at right angles to said unidirectional magnetic field, adjusting the fields to produce substantial electronic magnetic resonance in the salt at the Larmor frequency determined by the gyromagnetic ratio of the electron and the intensity of the unidirectional field, rotating said alternating magnetic field applying means about an axis parallel to said unidirectional field at an angular velocity which is a function of the angular motion to be measured, deriving an electrical effect corresponding to the shift from the condition of electronic magnetic resonance caused by the rotation of said alternating field applying means, and measuring said electrical effect.

8. The method of measuring angular motion which comprises applying to a ferromagnetic metal a unidirectional magnetic field, providing means for applying an alternating magnetic field to said metal at right angles to said unidirectional magnetic field, adjusting the fields to produce a substantial electronic magnetic resonance in the metal at the Larmor frequency determined by the gyromagnetic ratio of the electron and the intensity and magnetic induction of the unidirectional field, rotating said alternating magnetic field applying means about an axis parallel to said unidirectional field at an angular velocity which is a function of the angular motion to be measured, deriving an electrical effect corresponding to the shift from the condition of electronic magnetic resonance caused by the rotation of said alternating field applying means, and measuring said electrical effect.

9. The method of measuring angular motion which comprises applying to a ferromagnetic alloy a unidirectional magnetic field, providing means for applying an alternating magnetic field to said alloy and right angles to said unidirectional magnetic field, adjusting the fields to produce substantial electronic magnetic resonance in the alloy at the Larmor frequency determined by the gyromagnetic ratio of the electron and the intensity and magnetic induction of the unidirectional magnetic field, rotating said alternating magnetic field applying means about an axis parallel to said unidirectional field at an angular velocity which is a function of the angular motion to be measured, deriving an electrical effect corresponding to the shift from the condition of electronic magnetic resonance caused by the rotation of said alternating magnetic field applying means, and measuring said electrical effect.

10. The method of measuring angular motion which comprises applying to a nuclear resonance sample having nuclei of gyromagnetic ratio $\gamma$ a unidirectional magnetic field of intensity H, providing means for applying to said sample at right angles to said unidirectional magnetic field an alternating magnetic field of frequency $f$ to produce substantial nuclear resonance in the sample and rotating said alternating magnetic field applying means about an axis parallel to said unidirectional field at an angular velocity $\omega$ which is a function of the angular motion to be measured, deriving an electrical effect corresponding to the shift from the condition of nuclear resonance caused by the rotation of said alternating magnetic field applying means, and measuring said electrical effect.

11. The method of measuring angular motion which comprises applying to a paramagnetic sample having uncoupled electrons of gyromagnetic ratio $\gamma$ a unidirectional magnetic field of intensity H, providing means for applying to said sample at right angles to said unidirectional magnetic field an alternating magnetic field of frequency $f$ to produce substantial electronic magnetic resonance in the sample and rotating said alternating magnetic field applying means about an axis parallel to said unidirectional field at an angular velocity $\omega$ which is a function of the angular motion to be measured, deriving an electrical effect corresponding to the shift from the condition of magnetic resonance caused by the rotation of said alternating magnetic field applying means, and measuring said electrical effect.

12. The method of measuring angular motion which comprises applying to a ferromagnetic sample having uncoupled electrons of gyromagnetic ratio $\gamma$ a unidirectional magnetic field of intensity H and a magnetic induction B, providing means for applying to said sample at right angles to said unidirectional magnetic field an alternating magnetic field of frequency $f$ to produce substantial electronic magnetic resonance in the sample and rotating said alternating magnetic field applying means about an axis parallel to said unidirectional field at an angular velocity $\omega$ which is a function of the angular motion to be measured, deriving an electrical effect corresponding to the shift from the condition of magnetic resonance caused by the rotation of said alternating magnetic field applying means, and measuring said electrical effect.

13. The method of measuring angular motion which comprises applying to a magnetic resonant sample a unidirectional magnetic field, providing means for applying an alternating magnetic field of frequency $f1$ to said sample at right angles to said unidirectional magnetic field to establish substantial magnetic resonance at the Larmor frequency $v$ and rotating said alternating magnetic field applying means about an axis parallel to said unidirectional field at an angular velocity $\omega$ which is a function of the angular motion to be measured, adjusting the frequency of said alternating magnetic field to frequency $f2$ to reestablish substantial magnetic resonance, deriving an electrical effect corresponding to the relation $\omega=2\pi(v-f2)$, and measuring said electrical effect.

14. The method of measuring angular velocity of a rotating member which comprises applying to a magnetic resonant sample a unidirectional magnetic field, providing about said sample a coil having its axis at right angles to the direction of said unidirectional magnetic field, energizing said coil at a first frequency to establish substantial magnetic resonance in said sample at the Larmor frequency $v$, rotating said coil about the direction of said unidirectional magnetic field at an angular velocity which is a function of the angular velocity of said member, energizing said coil at a second frequency to reestablish substantial magnetic resonance, said second frequency of energization for magnetic resonance being a function of the angular velocity of said coil, and measuring the difference between said first and second frequencies.

15. The method of measuring angular deviations of a craft from a predetermined heading which comprises providing on such craft a magnetic resonance sample, applying to said sample a unidirectional magnetic field, providing about said sample a coil having its axis at right angles to the direction of said field and in fixed relation to the heading of said craft, energizing said coil at a frequency to establish substantial magnetic resonance in said sample, rotating said coil about the direction of said unidirectional magnetic field by an amount proportional to the angular deviation of said craft from a predetermined heading, deriving an electrical effect corresponding to the shift from the condition of magnetic resonance caused by the rotation of said coil, and measuring said electrical effect.

16. The method of measuring angular motion which comprises applying to a nuclear resonant sample a unidirectional magnetic field of variable intensity H, providing means for applying an alternating magnetic field of frequency $f$ at right angles to said unidirectional magnetic field, providing adjacent to said sample a coil having its axis at right angles to the direction of said unidirectional magnetic field, periodically varying the field intensity H to establish periodically magnetic resonance in the sample at a point in the field intensity cycle determined by the relation $$H=\frac{1}{\gamma}(2\pi f)$$

whereby a voltage is induced in said coil, converting said voltage to a visual image having a reference position indicative of said magnetic resonance condition and corresponding to the magnitude of H producing such condition, rotating said coil and said alternating magnetic field applying means together about an axis parallel to said unidirectional magnetic field at an angular velocity $\omega$ which is a function of the angular motion to be measured whereby magnetic resonance is shifted to a different point in the field intensity cycle determined by the relation $$H=\frac{1}{\gamma}(2\pi f+\omega)$$

causing a shift of said visual image and measuring the shift of said visual image from said reference position to determine the direction and magnitude of said angular velocity.

17. The method of measuring angular deviation of apparatus from a predetermined angular position, which comprises applying to a magnetic resonance sample a unidirectional magnetic field, providing means for applying an alternating magnetic field to said sample at right angles to said unidirectional field, adjusting the field conditions to produce substantial magnetic resonance in the sample, rotating said alternating magnetic field applying means about an axis parallel to said unidirectional field at an angular velocity which is a function of the angular deviation to be measured, deriving an electrical effect corresponding to the magnetic resonance condition, measuring said electrical effect upon changes in said resonance condition due to said angular velocity, and integrating said measured effects to determine changes in the angular position of the apparatus.

18. The method of measuring angular motion which comprises applying to a magnetic resonance sample a unidirectional magnetic field, providing about said sample a coil having its axis at right angles to the direction of said unidirectional field, providing means to indicate the apparent Q of said coil, varying the frequency of said alternating voltage to a first frequency where the value of said apparent Q indicates that a condition of magnetic resonance has been reached, rotating said coil in response to the angular motion to be measured about an axis parallel to the direction of said unidirectional field, varying the frequency of said alternating voltage to a second frequency where the value of said apparent Q indicates that a condition of magnetic resonance has again been reached, and measuring the difference between said first and second frequencies which difference is a function of the angular motion of said coil.

19. The method of measuring angular motion which comprises applying to a magnetic resonance sample a unidirectional magnetic field, providing about said sample a coil having its axis at right angles to the direction of said unidirectional field, energizing said coil with an alternating voltage in order to produce an alternating magnetic field, providing means to indicate the apparent inductance of said coil, varying the frequency of said alternating voltage to a first frequency where the value of said apparent inductance indicates that a condition of magnetic resonance has been reached, rotating said coil in response to the angular motion to be measured about an axis parallel to the direction of said unidirectional field, varying the frequency of said alternating voltage to a second frequency where the value of said apparent inductance indicates that a condition of magnetic resonance has again been reached, and measuring the difference between said first and second frequencies which difference is a function of the angular motion of said coil.

20. The method of measuring angular motion which comprises applying to a magnetic resonance sample a unidirectional magnetic field, providing about said sample a first coil having its axis at right angles to the direction of said unidirectional field, providing adjacent to said sample a second coil having its axis at right angles to the axis of said first coil and at right angles to the direction of said unidirectional magnetic field, energizing said first coil with an alternating voltage in order to produce an alternating magnetic field, providing means to indicate the voltage induced in said second coil, varying the frequency of said alternating voltage to a first frequency where the value of said induced voltage indicates that a condition of magnetic resonance has been reached, rotating said first and second coils together in response to the angular motion to be measured about an axis parallel to the direction of said unidirectional field, varying the frequency of said alternating voltage to a second frequency where the value of said induced voltage indicates that a condition of magnetic resonance has again been reached, and measuring the difference between said first and second frequencies which difference is a function of the angular motion of said coils.

21. The method of measuring angular motion which comprises applying to a magnetic resonance sample a unidirectional magnetic field, providing about said sample a coil having its axis at right angles to the direction of said unidirectional field, energizing said coil with an alternating voltage in order to produce an alternating magnetic field, providing means to indicate the apparent Q of said coil, varying the frequency of said alternating voltage until the value of said apparent Q indicates that a condition of magnetic resonance has been reached, rotating said coil in response to the angular motion to be measured about an axis parallel to the direction of said unidirectional field thereby causing a shift from said condition of magnetic resonance and a change in the apparent Q, and measuring said change in the apparent Q.

22. The method of measuring angular motion which comprises applying to a magnetic resonance sample a unidirectional magnetic field, providing about said sample a coil having its axis at right angles to the direction of said unidirectional field, energizing said coil with an alternating voltage in order to produce an alternating magnetic field, providing means to indicate the apparent inductance of said coil, varying the frequency of said alternating voltage until the value of said apparent inductance indicates that a condition of magnetic resonance has been reached, rotating said coil in response to the angular motion to be measured about an axis parallel to the direction of said unidirectional field thereby causing a shift from said condition of magnetic resonance and a change in the apparent inductance, and measuring said change in the apparent inductance.

23. The method of measuring angular motion which comprises applying to a magnetic resonance sample a unidirectional magnetic field, providing about said sample a first coil having its axis at right angles to the direction of said unidirectional field, providing adjacent to said sample a second coil having its axis at right angles to the axis of said first coil and at right angles to the direction of said unidirectional magnetic field, energizing said first coil with an alternating voltage in order to produce an alternating magnetic field, providing means to indicate the voltage induced in said second coil, varying the frequency of said alternating voltage until the value of said induced voltage indicates that a condition of magnetic resonance has been reached, rotating said first and second coils together in response to the angular motion to be measured about an axis parallel to the direction of said unidirectional field thereby causing a shift from said condition of magnetic resonance and a change in the induced voltage, and measuring said change in the induced voltage.

24. Apparatus for measuring angular motion comprising a magnetic resonance sample, means for applying a unidirectional magnetic field to said sample parallel to a line through said sample, means for applying an alternating magnetic field to said sample at right angles to said line, means for varying at least one of said fields in order to produce substantial magnetic resonance in said sample, means for rotating said apparatus about an axis parallel to said line at an angular velocity which is a function of the angular motion to be measured, said magnetic resonance condition changing in response to rotation of said apparatus, and means responsive to said change for producing an effect indicative of the angular motion to be measured.

25. Apparatus for measuring angular motion comprising a magnetic resonance sample, means for applying a unidirectional magnetic field to said sample parallel to a line through said sample, means for applying an alternating magnetic field to said sample at right angles to said line, means for varying said unidirectional magnetic field in order to produce substantial magnetic resonance in said sample, means for rotating said apparatus about an axis parallel to said line at an angular velocity which is a function of the angular motion to be measured, said magnetic resonance condition changing in response to rotation of said apparatus, and means responsive to said change for producing an effect indicative of the angular motion to be measured.

26. Apparatus for measuring angular motion comprising a magnetic resonance sample, means for applying a unidirectional magnetic field to said sample parallel to a line through said sample, means for applying an alternating magnetic field to said sample at right angles to said line, means for varying said alternating magnetic field in order to produce substantial magnetic resonance in said sample, means for rotating said apparatus about an axis parallel to said line at an angular velocity which is a function of the angular motion to be measured, said magnetic resonance condition changing in response to rotation of said apparatus, and means responsive to said change for producing an effect indicative of the angular motion to be measured.

References Cited in the file of this patent

UNITED STATES PATENTS 2,561,489  Bloch et al. _____ July 24, 1951

UNITED STATES PATENT OFFICE
CERTIFICATE OF CORRECTION

Patent No. 2,841,760                                                          July 1, 1958

Albert Hansen, Jr.

It is hereby certified that error appears in the printed specification of the above numbered patent requiring correction and that the said Letters Patent should read as corrected below.

Column 11, line 12, Claim 9, for "alloy and right angles" read -- alloy at right angles --.

Signed and sealed this 5th day of April 1960.

(SEAL)
Attest:

KARL H. AXLINE                                          ROBERT C. WATSON
Attesting Officer                                       Commissioner of Patents